United States Patent [19]

Horner et al.

[11] Patent Number: 5,148,316
[45] Date of Patent: Sep. 15, 1992

[54] AVERAGED AMPLITUDE ENCODED PHASE-ONLY FILTERS FOR USE IN FOURIER TRANSFORM OPTICAL CORRELATORS

[75] Inventors: Joseph L. Horner, Belmont, Mass.; Mary A. Flavin, Satellite Beach, Fla.

[73] Assignee: The United States of America as represented by the Secretary of the Air Force, Washington, D.C.

[21] Appl. No.: 693,473

[22] Filed: Apr. 30, 1991

Related U.S. Application Data

[63] Continuation-in-part of Ser. 416,757, Oct. 3, 1989, abandoned.

[51] Int. Cl.$^5$ .................. G02B 27/46; G03H 1/16; G06E 3/00
[52] U.S. Cl. .................. 359/561; 359/29; 364/822
[58] Field of Search .......... 350/162.12–162.15, 350/3.7, 3.72, 3.74, 3.82, 320; 359/559–563, 15, 19, 21, 29; 364/822; 382/42

[56] References Cited

U.S. PATENT DOCUMENTS

| | | | |
|---|---|---|---|
| 4,588,260 | 5/1986 | Horner | 359/561 |
| 4,765,714 | 8/1988 | Horner | 359/561 |
| 4,826,285 | 5/1989 | Horner | 359/561 |
| 5,024,508 | 6/1991 | Horner | 364/822 |
| 5,040,140 | 8/1991 | Horner | 359/561 |

OTHER PUBLICATIONS

Flannery et al. "Design elements of binary phase-only correlation filters", Applied Optics, vol. 27, No. 20, pp. 4231–4235, Oct. 15, 1988.

Primary Examiner—Bruce Y. Arnold
Assistant Examiner—James Phan
Attorney, Agent, or Firm—Robert L. Nathans; Donald J. Singer

[57] ABSTRACT

Method of producing an averaged amplitude mask, for use in conjunction with a phase only filter (pOF) to provide an averaged amplitude matched filter (AAMF) in a Fourier transform optical correlator, involves intensity normalizing a plurality of reference images within a given class of objects, averaging the intensities of the reference images, Fourier transforming the resulting data, and utilizing the resultant amplitude function, exclusive of phase, of the Fourier transform to produce the averaged amplitude filter. A number of such masks are sequentially positioned adjacent the POF to very rapidly determine whether an input image falls within a particular class of objects, or whether the input image is of a particular object within the class.

12 Claims, 4 Drawing Sheets

TABLE I

| FILTER | CORRELATION | CONVOLUTION |
|---|---|---|
| CMF | 1.0 | 0.74 |
| BCMF | 0.6 | 0.44 |
| POF | 31.1 | 7.10 |
| BPOF | 19.5 | 3.97 |

FIG. 4

TABLE II

| INPUT IMAGE | CLASSICAL MATCHED FILTER | AVERAGE AMPLITUDE MATCHED FILTER |
|---|---|---|
| A | 1.0 | 0.93 |
| B | 0.83 | 0.85 |
| C | 0.71 | 0.71 |
| D | 0.84 | 0.86 |
| E | 0.75 | 0.78 |
| F | 0.76 | 0.79 |
| G | 0.40 | 0.39 |

FIG. 5

TABLE III

| INPUT IMAGE | CLASSICAL MATCHED FILTER | AVERAGE AMPLITUDE MATCHED FILTER |
|---|---|---|
| A | 4.80 | 4.80 |
| B | 4.62 | 4.46 |
| C | 4.55 | 4.41 |
| D | 4.69 | 4.52 |
| E | 4.91 | 4.79 |
| F | 4.74 | 4.60 |
| G | 6.17 | 6.06 |

FIG. 6

TABLE IV

| INPUT IMAGE | BINARY CLASSICAL MATCHED FILTER | | BINARY AVERAGE AMPLITUDE MATCHED FILTER | |
|---|---|---|---|---|
| | CORRELATION | CONVOLUTION | CORRELATION | CONVOLUTION |
| A | 0.59 | 0.44 | 0.55 | 0.45 |
| B | 0.49 | 0.47 | 0.51 | 0.47 |
| C | 0.44 | 0.38 | 0.46 | 0.38 |
| D | 0.49 | 0.48 | 0.51 | 0.50 |
| E | 0.48 | 0.46 | 0.49 | 0.48 |
| F | 0.47 | 0.48 | 0.48 | 0.47 |
| G | 0.25 | 0.26 | 0.25 | 0.25 |

FIG. 7

AVERAGED AMPLITUDE ENCODED PHASE-ONLY FILTERS FOR USE IN FOURIER TRANSFORM OPTICAL CORRELATORS

STATEMENT OF GOVERNMENT INTEREST

The invention described herein may be manufactured and used by or for the Government for governmental purposes without the payment of any royalty thereon.

This application is a continuation of Ser. No. 07/416,757, filed Oct. 3, 1989, now abandoned.

BACKGROUND OF THE INVENTION

One aspect of the pattern recognition problem is identifying an object as a member of a class of objects. We propose a simple optical method of performing this task by taking advantage of the response of a classical matched filter (CMF) used in an optical correlator. The CMF has been shown to have a broad correlation peak while the response of a phase-only filter (POF) is quite sharp. Previous studies have shown that the POF is very sensitive to an exact pattern match where a CMF is less sensitive. This feature of the CMF implies, in some cases, it could be used to advantage in detecting a class rather than a specific object. Unfortunately, the CMF, which is a complex valued filter containing both amplitude and phase, has been implemented only on photographic film using holography. This is impractical in a real-time system. Further, as the correlation information is located in the higher diffraction orders, holographic schemes have low light efficiencies. A CMF filter contains a complex function Since a complex number is represented as a point on the complex plane, it is necessary to describe it by a real and imaginary part (both of which are real numbers) or by a magnitude and a phase angle (real numbers). Regardless, two pieces of information are needed to specify a complex number. Filter media whether photographic film, an etched quartz substrate, or a spatial light modulator (SLM) can only store one real function. VanderLugt used holographic techniques to solve this dilemma by encoding the CMF data on a spatial carrier frequency. In recent years, it has been demonstrated that optical correlation is much more sensitive to the phase information from the reference image transform. Amplitude is set to one over the entire filter. The POF is represented mathematically by a real function and could be written directly on a media. Because it is not necessary to use holography, the effective diffraction efficiency (Horner efficiency) for the POF is nearly 100%, and the correlation information is found in the zeroth order. See U.S. Pat. Nos.4,588,260, 4,765,714 and 4,826,285, to J. Horner, incorporated by reference herein For further background information see also our articles published in "Applied Optics" 1 May 1989, Vol. 28, No. 9; and in "Optical Engineering", May 1989, Vol. 28, No. 5.

SUMMARY OF THE PREFERRED EMBODIMENTS OF THE INVENTION

In order to mimic the response of a CMF, we write the phase and amplitude separately. This is achieved by placing a POF in the Fourier transform plane of a correlator and placing an averaged amplitude mask adjacent the POF to make the averaged amplitude matched filter (AAMF). Our computer simulations show that an ensemble average of a class of objects can be substituted for the exact amplitude function of a CMF with similar correlation results.

This provides a simple method of determining whether an unknown object (input image) is a member of a class of objects, and our computer simulations show this changes the output from a POF correlation response to a classical matched filter (CMF) response The CMF is less sensitive to an exact pattern match than the POF, which can be an advantage in detecting a class of objects. An input image to be identified can thus be matched with a single reference filter representing an entire class of objects, rather than a reference filter for each object, and thus the correlation process is greatly speeded up.

We took the Fourier transform of an ensemble average of five similar intensity normalized input images, and utilized the amplitude function of the transform to make the amplitude mask for use in the average amplitude matched filter (AAMF). The AAMF emulated the response of the CMF in our auto- and cross-correlation simulations. We also simulated binary phase-only versions of the CMF and AAMF. Again, the binary AAMF (BAMF) emulated the correlation response of the binary CMF (BCMF).

BRIEF DESCRIPTION OF THE DRAWINGS

Other objects, features, and advantages of the present invention will become apparent upon study of the following description taken in conjunction with the drawings in which:

FIGS. 4–7 illustrate tables of comparative data produced by computer simulations.

DETAILED DESCRIPTION OF THE INVENTION

Figure 1:
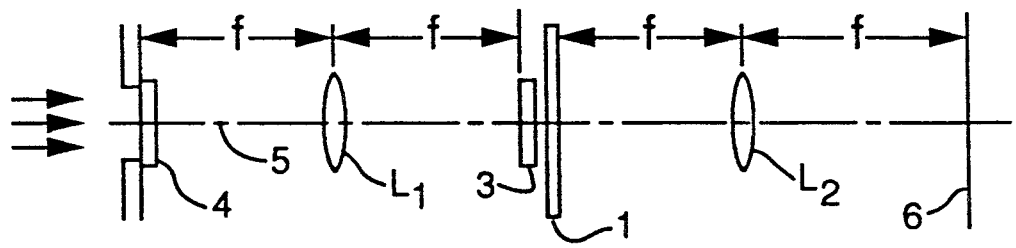
FIGS. 1 and 2 illustrate preferred optical correlators embodying the invention.
Figure 2:
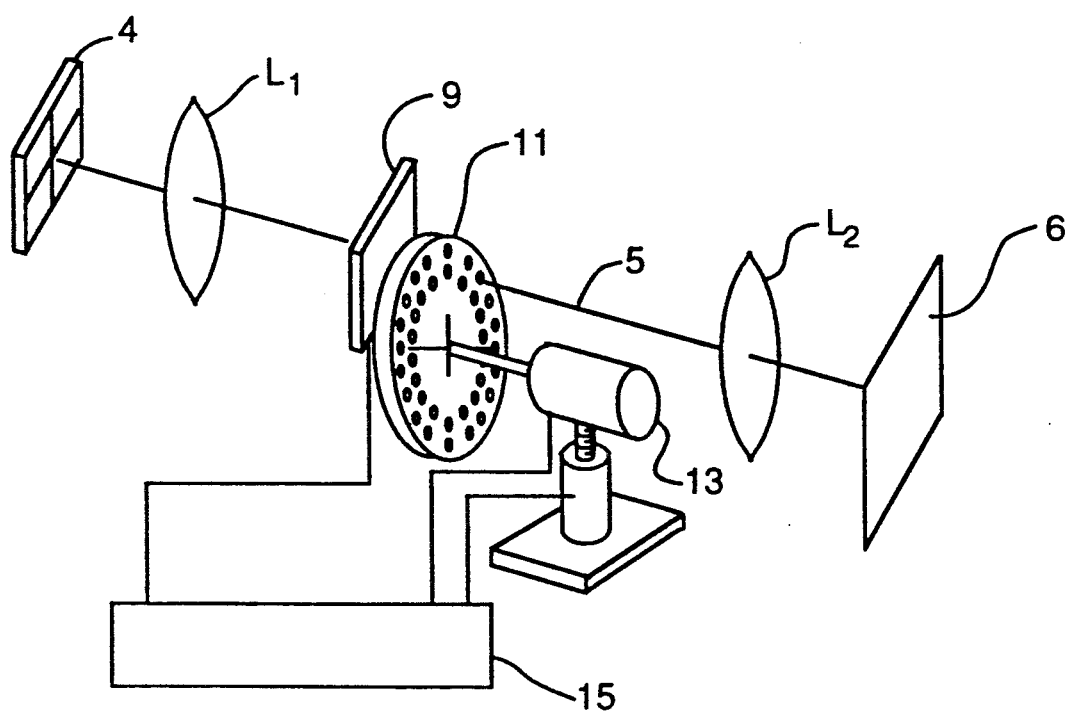

A schematic of an AAMF optical correlator is shown in FIG. 1, where the amplitude mask 1 is shown behind the POF 3 of a 4f correlator. We arbitrarily chose to place the amplitude mask behind the POF. The amplitude mask could be positioned in front of the POF with no change in the performance of the system. POF 3 is positioned in the Fourier plane, and the remaining components, namely lenses $L_1$, $L_2$, image input plane 4 and output plane 6 positioned along optical axis 5 are conventional Input plane 4 bears an image of an object to be identified, and is illuminated by laser light In FIG. 2, we show an AAMF optical correlator. The POF is written on spatial light modulator or SLM 9 in the Fourier transform plane, with a bank of averaged amplitude masks on mask wheel 11 behind the POF. Alternatively, it is now possible to write a POF on an amplitude responsive SLM. See our co-pending patent application entitled "Amplitude Encoded Phase-only Filters for Optical Correlators" filed Apr. 4, 1989. Our studies have shown that phase information is much more critical in correlation than amplitude information. Thus we conclude, while the position of the POF is critical, the position of the amplitude mask is not. A stepper motor 13 can be used to position a variety of amplitude masks each representing a class of objects adjacent SLM 9. A small computer 15 can write the POF on the SLM and control which amplitude mask is in an operable position adjacent SLM 9.

A presently preferred method of preparing each of our averaged amplitude masks (amplitude masks) comprises the following steps:

(a) intensity normalizing a plurality of reference images within a given class of objects;

(b) averaging the intensities of the reference images;

(c) Fourier transforming the data produced in accordance with step (b); and (d) utilizing the amplitude function, exclusive of phase, of the Fourier transform produced in accordance with step (c) to record the averaged amplitude filter or mask.

An alternate method comprises the following steps:

(a) intensity normalizing a plurality of reference images within a given class of objects;

(b) Fourier transforming each reference image;

(c) averaging the amplitudes, exclusive of phase, of the Fourier transform of each reference image; and (d) utilizing the averaged amplitudes produced in accordance with step (c) to record the averaged amplitude filter or mask.

The steps of both methods are carried out by digital computer 15. The second method is presently less preferred since Fourier transforming each reference image should be more time consuming. Each mask physically looks like a checker board of gray scale levels.

When comparing outputs resulting from a variety of input signals the results can be erroneous if the energy content of the inputs have not been properly normalized. Otherwise, a strong input, that is, one with more energy, can produce a spurious peak in a cross-correlation which is larger than the correlation peak. From Parsevals theorem, $$\int\int |f(x,y)|^2 dxdy = \int\int |F(\xi,\nu)|^2 d\xi d\nu \quad (1)$$

where f(x,y) is the input image and F($\xi,\nu$) is its Fourier transform, we equate the input energy to the Fourier transform energy. In computer processing of an image, the discrete element equivalent of Eq. (1) is $$\sum_i^N \sum_j^N f_{ij}^2 = \sum_i^N \sum_j^N F_{ij}^2 \quad (2)$$

To ensure equal energy, we normalized each image in, FIG. 3(a)–FIG. 3(g) by dividing by a normalization factor. The normalization factor for each picture was found by taking the square root of the sum of the squares over all the pixels. On comparing the energy content of the images, the highest, FIG. 3d, contained 10 times the energy of the lowest, FIG. 3g. Once normalized, each image contained the same total energy or light intensity, that is, one.

Faces, human and otherwise, from the Image Processing Institute, University of Southern California, digitized image data files were used as a class of objects to be recognized, [FIG. (3a-f)]. A digitized data file of an edge enhanced tank [FIG. (3g)] was used for cross correlations with an out-of-class object. Each image contains 64×64 pixels embedded in the lower left corner of a 128×128 zero filled array. The AAMF for the class of facial images was synthesized from the conjugate of the phase of a particular face or reference image in the class of facial images (FIGS. a-f) to provide the POF, and the ensemble average amplitude of the normalized images of FIGS. (3a-f) was used to make the amplitude mask as explained above.

Figure 3A:
FIG. 3(a)–FIG. 3(g) illustrate a series of test images used in the correlator.
Figure 3B:
Figure 3C:
Figure 3D:
Figure 3E:
Figure 3F:
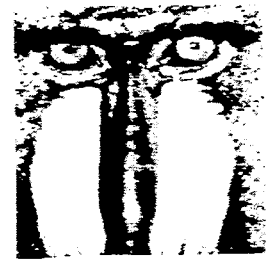

In a similar manner, the binary versions of the CMF and AAMF were constructed using the phase information from the particular reference image of e.g. FIG. 3a. We chose to synthesize a sine-BPOF; the phase is binarized around the real axis in the complex plane. The phase information was set to 0 for phases between 0 to $\pi$ and to $\pi$ for phases between $\pi$ to $2\pi$ The amplitude information for the binary AAMF (BAMF) was the same ensemble average of the normalized facial images (FIGS. 3a-f) as in the continuous phase case, while the binary CMF (BCMF) used the amplitude from FIG. 3a only. A consequence of filtering with BPOFs is that both the correlation and the convolution appear in the correlation plane. In our simulation studies and experiments with a quartz BPOF, the correlation peak is much greater than the convolution peak, and is thus readily distinguishable. The inputs used in these simulations are real non-symmetric images. The introduction of an amplitude function to the BPOF yielded a CMF-like correlation response, but at the same time increased the convolution response.

When we formulate a BPOF, the phase is restricted to two values For our studies, we used phase values of 0 and $\pi$ which give equivalent real number of $\pm 1$. If we recall that any pair of conjugate vectors sum to a real number, then we can consider each element of a BPOF a vector sum. Although we chose to use the sine-BPOF, the vector sum concept is easier to conceptualize using a cosine-BPOF where we binarize around the imaginary axis. The difference between the sine and cosine BPOF is a constant $\pi/2$ phase shift, which is of no consequence in the discussion below. Since the magnitude of the vectors of each element in a BPOF must sum to $|1|$, then $$H_{ij} = \frac{e^{-j\phi(\xi,\nu)}}{2} + \frac{e^{j\phi(\xi,\nu)}}{2} + d(\xi,\nu) = \pm 1 \quad (3)$$

where d($\xi,\nu$), forces the vectors to add to $\pm 1$. It is easy to show that $$d(\xi,\nu) = 1 - \cos[\phi(\xi,\nu)] \text{ when Real } (H_{io}) > 0 \text{ (right hand plane).} \quad (4a)$$

$$d(\xi,\nu) = -(1 \pm \cos[\phi(\xi,\nu)]) \text{ when Real } (H_{ij}) < 0 \text{ (left hand plane).} \quad (4b)$$

clearly $|d(\xi,\nu)| \leq 1$. From Eq. (3) we see that each filter element contains two continuous Phase functions. The first term corresponds to the correlation, while the second term corresponds to the convolution. Thus, the auto-correlation response of the BPOF is $$C_{BPOF}(x',y') = \frac{1}{2}FT^{-1}\{|S(\xi,\nu)|\} + \quad (5)$$

$$\frac{1}{2}FT^{-1}\{|S(\xi,\nu)|e^{j2\phi(\xi,\nu)}\} + FT^{-1}\{d(\xi,\nu)|S(\xi,\nu)|e^{j\phi(\xi,\nu)}\}$$

The first term in Eq. (5) is half the continuous phase POF correlation response, while the second term is half the convolution. If d($\xi,\nu$) were equal to one for all frequencies, then the third term would be s(x,y). However, d($\xi,\nu$) is discontinuous, making the third term in Eq. (5) difficult to calculate. Thus, d($\xi,\nu$) contributes noise to the correlation plane.

Multiplying the BPOF by either the exact amplitude information from the matching input or an average amplitude function changes the filter to the BCMF or BAMF respectively. Amplitude is no longer constrained to $|1|d(\xi,\nu)$ drops out. The BCMF filter as an example is given by $$H_{ij} = \frac{|S(\xi,\nu)|}{2} e^{-j\phi(\xi,\nu)} + \frac{|S(\xi,\nu)|}{2} e^{j\phi(\xi,\nu)} \quad (6)$$

The auto-correlation response of the BCMF is then $$C_{BCMF}(x',y') = \tfrac{1}{2}FT^{-1}\{|S(\xi,\nu)|^2\} + \tfrac{1}{2}FT^{-1}\{|S(\xi,\nu)|^2 e^{j2\phi(\xi,\nu)}\} \quad (7)$$

The first term of Eq. (7) is half the CMF correlation response while the second is half the convolution. The convolution part of Eq. (7) contains an amplitude squared term, which implies a broader, CMF-like response in the output plane.

We computed the correlation and convolution terms for a POF and CMF, and compared the corresponding correlation and convolution terms of the BPOF and BCMF. The results (Table I) show that the POF convolution peak is 23% that of the auto-correlation peak, but in the CMF case the convolution peak is 74% of the auto-correlation peak.

In our simulations, the filters were made from images located in the lower left corner of a zero filled array. If a binary phase filter, i.e., the BCMF, BAMF, or BPOF, was made from a centered image the convolution and correlation would fall on top of each other. By using off centered images to construct the filters, the convolution and correlation parts of the response were separated. The correlation and convolution results for the binary versions of the filters, i.e., the BPOF and BCMF, show similar convolution to correlation maximums as the POF and CMF (Table I).

Figure 3G:

In our continuous phase study, each input image was correlated with a CMF and the AAMF. Both filters contained the continuous phase information of FIG. (3a). The faces [FIGS. (3a-f)] were considered in-class images while the tank [FIG. (3g)] was considered the out-of-class image. Table II shows the results of the auto and cross correlations where the data was normalized to the CMF auto correlation peak. The auto-correlation peak from the AAMF was 92% of the CMF auto-correlation peak, while the in class cross-correlation peaks were at least 72% of CMF results. The cross correlation peak with the out of class image, that is the tank of FIG. 3g, is less than 40%. Comparing the magnitude of the AAMF auto-and cross-correlation peaks to the respective CMF peaks gives an average difference of 3%. It should be noted that the correlator of this invention can be used in two modes: a class identification mode and an individual pattern identification mode. Referring to table II, if the decision threshold level in the correlation plane is set at 0.79, the entire group of facial images in the class will be identified. If the threshold is set at 0.93, just one specific face (FIG. 3a) will be picked out.

The signal to noise ratios (SNR) ratios were also compared. Noise was considered to be the root mean squared (RMS) value of all pixels less than half the maximum pixel value:

$$SNR = A_{MAX}\left[\frac{1}{N'}\sum_{A}^{N'} A^2_{<50\%}\right]^{-\tfrac{1}{2}} \quad (8)$$

where A is the amplitude and N' is the number of correlation pixels less than 50%. The results tabulated in Table III show the average difference between the CMF and AAMF SNR was 13%. The minimum SNR ratio for the in class images was 4.6 for the CMF and 4.4 for AAMF while the SNR for the out of class image was 6.1. However, this is deceptive because the maximum cross-correlation value was 39% of the CMF auto-correlation peak and the cross-correlation maximum was off axis. This indicates that the input is not in the reference class.

The correlation simulations were repeated with the BCMF and BAMF. As predicted by Eq. (7), a correlation term and convolution term of nearly the same magnitude appeared in the output. The magnitudes of the auto-correlation and convolution were about half the magnitude of the auto-correlation peak of the CMF. It was fortuitous that we performed these simulations with filters made from images placed in the lower left quadrant. Since the correlation and convolution terms are distinct, the maximum value for each term could be found and are tabulated in Table IV. For both the BCMF and BAMF the correlation maximum was about 60% of the continuous phase CMF auto-correlation peak while the greatest convolution peak was 50% of the CMF auto-correlation peak.

The results show that the convolution part of the response is nearly as large as the correlation. The auto-correlation response of the BCMF and BAMF is identifiable as the foreground peak, but it is not much larger than the convolution peak that also appears. We found that the BAMF does emulate the response of the BCMF. The convolution response is so large that the task of identifying an object as a member of a particular class has been complicated. However, the BCMF and BAMF average maximum for an in-class object is 80% of the BCMF auto-correlation peak, while the maximum for the out-of-class object is 42% of the BCMF auto-correlation peak.

Our computer simulations show that a "matched" filter containing continuous phase information and the aforesaid amplitude information obtained from an ensemble average closely emulates the CMF correlation response. The average difference between the CMF and AAMF auto- and cross-correlation response was 3%. We have shown that a CMF and AAMF discriminate against a particular out-of-class object.

Our simulations with a binary version of the CMF and AAMF revealed that the relative magnitudes of the convolution and correlation components of a binary phase filter are affected by the amplitude function. The amplitude function not only spreads the correlation response, but forces energy into the convolution so that the convolution is nearly the same magnitude as the correlation.

An important advantage of the AAMF is that it can be written and implemented in real-time by writing the phase and amplitude separately using a POF in the Fourier transform plane, and a transmission mask with the amplitude function in front or behind the POF. In this way the response of a classical matched filter can be emulated and may be used to advantage to rapidly detect which of several classes of objects the input image falls into.

While preferred embodiments of the present invention have been described, numerous variations will be apparent to the skilled worker in the art, and thus the scope of the invention is to be restricted only by the terms of the following claims and art recognized equivalents thereof.

For example, the amplitude masks, need not be Photo-transparencies but could be amplitude functions sequentially written on a second SLM, for example, or in another image storage device.

Also, the aforesaid Fourier transformation of the input image at plane 4 together with the multiplication of the Fourier transform of the input image times the POF times the averaged amplitude mask, and the inverse Fourier transform step of the resulting product, performed optically as described above, may be carried out electronically in a digital computer. This will result in a substantial saving of computer time compared to prior art methods. The terms "mask" and "filters" are to be deemed equivalents.

What is claimed is:

1. In an optical correlator having first Fourier transform means for producing the Fourier transform of an input image, at a Fourier transform filter plane; a phase only reference filter positioned within said Fourier transform plane and second Fourier transform means for producing a correlation response signal, the improvement comprising:

an averaged amplitude mask optically co-acting with said phase only reference filter, said averaged amplitude mask representing the averaged amplitude of the Fourier transform, exclusive of phase, of a plurality of intensity normalized images within a homogenous class of images to be identified by said correlator.

2. The optical correlator of claim 1 further including positioning means for sequentially positioning a plurality of said averaged amplitude masks adjacent said phase only reference filter, each of said masks representing a class of images to be identified by said correlator.

3. The optical correlator of claim 2 wherein said positioning means comprises a movable support member bearing said plurality of masks.

4. The optical correlator of claim 3 wherein said phase only reference filter is a binary phase only filter.

5. The optical correlator of claim 2 wherein said phase only reference filter is a binary phase only filter.

6. The optical correlator of claim 1 wherein said phase only reference filter is a vinary phase only filter.

7. In an optical correlator having first Fourier transform means for producing the Fourier transform of an input image, at a Fourier transform filter plane; a phase only reference filter positioned within said Fourier transform plane and second Fourier transform means for producing a correlation response signal the improvement comprising:

an averaged amplitude mask positioned adjacent said phase only reference filter, said averaged amplitude mask representing the averaged amplitude of the Fourier transform, exclusive of phase, of a plurality of intensity normalized images within a homogenous class of images to be identified by said correlator.

8. The optical correlator of claim 9 further including positioning means for sequentially positioning a plurality of said averaged amplitude masks adjacent said phase only reference filter, each of said masks representing a class of images to be identified by said correlator.

9. The optical correlator of claim 10 wherein said positioning means comprises a rotatable support member bearing said plurality of masks.

10. The optical correlator of claim 9 wherein said phase only reference filter is a vinary phase only filter.

11. The optical correlator of claim 8 wherein said phase only reference filter is a vinary phase only filter.

12. The optical correlator of claim 7 wherein said phase only reference filter is a binary phase only filter.

* * * * *